United States Patent [19]

Cox et al.

[11] 4,211,193

[45] Jul. 8, 1980

[54] SPEED REGULATING SYSTEMS

[75] Inventors: Michael D. Cox; Norman Hunt; Kenneth W. Colver, all of Rugby, England

[73] Assignee: Associated Engineering Limited, England

[21] Appl. No.: 869,649

[22] Filed: Jan. 16, 1978

[30] Foreign Application Priority Data

Feb. 10, 1977 [GB] United Kingdom ............... 05611/77

[51] Int. Cl.² .......................................... B60K 31/00
[52] U.S. Cl. ...................................... 123/352; 180/179
[58] Field of Search ................. 123/97 B, 102, 103 R; 180/105 R, 105 E

[56] References Cited

U.S. PATENT DOCUMENTS

| | | | |
|---|---|---|---|
| 3,580,355 | 5/1971 | Kitano et al. ..................... | 180/105 F |
| 3,724,433 | 4/1973 | Voss et al. ........................... | 123/102 |
| 3,767,972 | 10/1973 | Noddings et al. ................ | 123/102 X |
| 3,885,137 | 5/1975 | Ooya et al. ........................ | 123/102 X |
| 3,952,829 | 4/1976 | Gray .................................... | 123/102 X |
| 4,133,406 | 1/1979 | Allerdist .......................... | 123/102 X |

Primary Examiner—Tony M. Argenbright
Attorney, Agent, or Firm—Leydig, Voit, Osann, Mayer & Holt, Ltd.

[57] ABSTRACT

A system for limiting the engine-driven speed of a vehicle (e.g. a truck) includes an override circuit to enable engine power to be produced when the vehicle exceeds the pre-set speed, provided that the vehicle is decelerating rapidly, such as occurs when the vehicle has coasted down a steep incline and is then running uphill. The system may include an interlock to prevent the override action until the engine power has first been reduced to a predetermined minimum.

5 Claims, 3 Drawing Figures

SPEED REGULATING SYSTEMS

BACKGROUND OF THE INVENTION

The invention relates to speed regulating systems and more particularly to speed regulating systems for engine-driven vehicles, such as road vehicles, and especially such systems which are intended to regulate the maximum speed at which the vehicle can be driven by its engine.

Speed regulating systems are known which compare the actual vehicle speed with a pre-set value thereof and shut off or reduce the engine power when the vehicle exceeds the pre-set speed. Such systems may be used in commercial vehicles, such as trucks, to prevent overspeeding and resultant damage to the vehicle or its engine, and/or for fuel economy purposes.

A disadvantage of known systems, however, is that they prevent use being made of the kinetic energy gained by a vehicle as it runs downhill. The effect of the vehicle exceeding the pre-set speed on a downhill road is of course a shut-off of engine power—although the vehicle speed will nevertheless continue to increase because of gravity. When the road becomes level, or possibly uphill, the vehicle speed begins to fall and engine power will not be increased until the speed has fallen below the pre-set maximum. Therefore, the kinetic energy gained by the vehicle running downhill is lost or wasted, with consequent waste of fuel.

An object of the invention, therefore, is to provide an improved vehicle speed regulating system.

A more specific object of the invention is to provide a vehicle speed regulating system which enables use to be made of the kinetic energy gained by a vehicle is running downhill.

SUMMARY OF THE INVENTION

According to the invention, there is provided a vehicle speed regulating system, comprising first input means responsive to the vehicle speed and operative to produce a first condition signal in response to the existence of a first condition, that the vehicle is decelerating at at least a predetermined rate, second input means responsive to the vehicle speed and operative to produce a second condition signal in response to the existence of a second condition, that the vehicle speed exceeds a predetermined relatively high value, control means connected to receive the first and second condition signals and operative only when they both simultaneously exist to produce an output signal, and engine power control means connected to receive the output signal and to respond thereto by tending to increase the vehicle engine power.

DESCRIPTION OF THE DRAWINGS

Speed regulating systems for regulating the speed of a road vehicle, and embodying the invention, will now be described, by way of example, with reference to the accompanying diagrammatic drawings in which.

DESCRIPTION OF PREFERRED EMBODIMENTS

Figure 1:
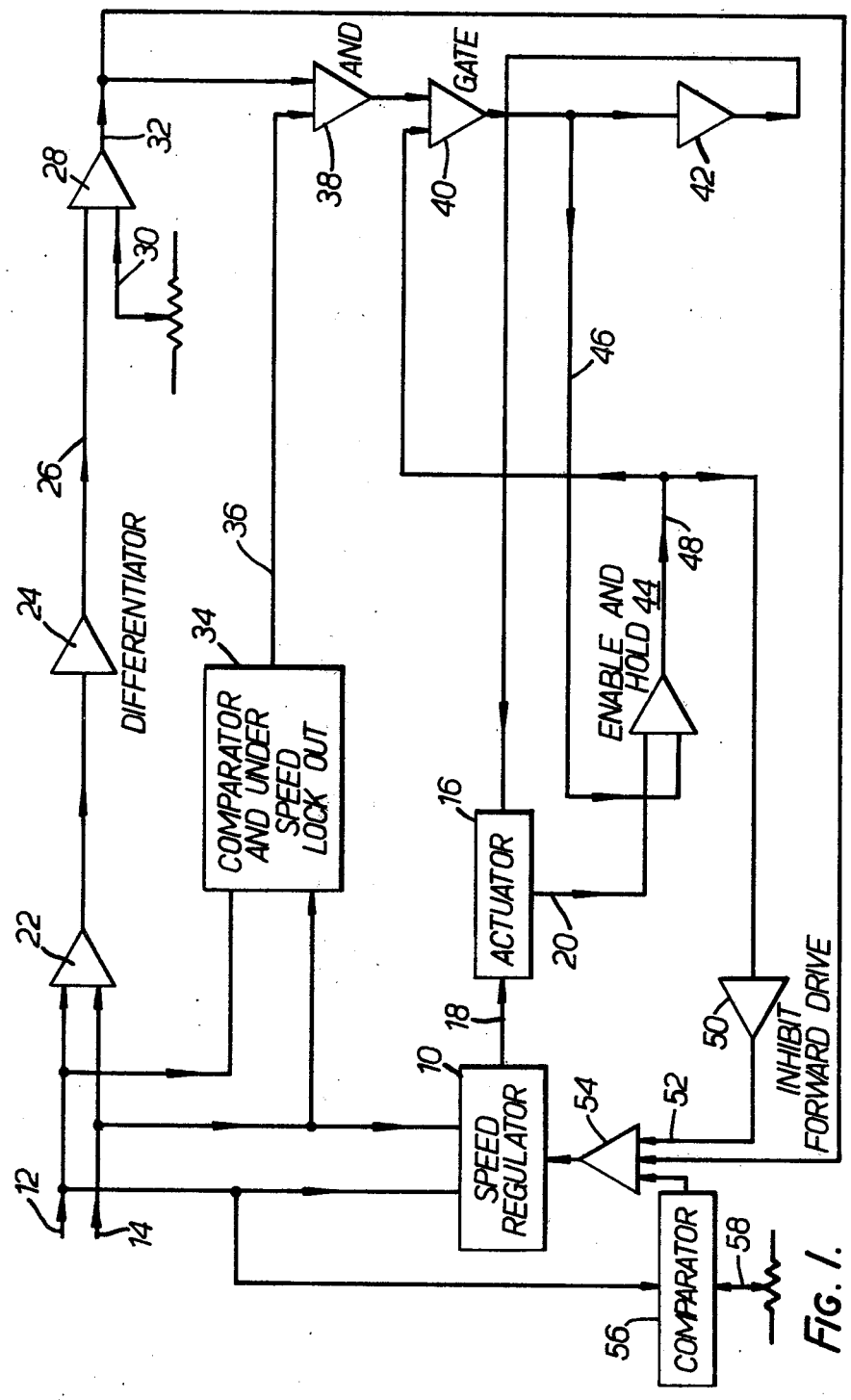
FIG. 1 is a block diagram of part of one of the systems.

In FIG. 1, that part of the speed regulating system which monitors the actual vehicle speed and compares it with the preset maximum value is shown by the block 10. This part of the system may, for example, be a modified form of the speed regulator described and claimed in British Pat. No. 1,386,961; that Patent primarily describes a system not merely for preventing the vehicle from exceeding a preset maximum but actually controlling it at a set level, but also one which may be modified (primarily by removing its speed memory circuit associated with the capacitor C4 described therein) so as simply to prevent a preset maximum speed from being exceeded. As shown in FIG. 1 herein, the block 10 receives an input signal on a line 12 representative of the actual vehicle speed and a signal on a line 14 representative of the predetermined maximum speed, that is, the maximum speed (referred to herein as Vr) at which the vehicle is to be driven by its engine. The signals on the lines 12 and 14 may be generated in any suitable way. For example, the signal on the line 12 may be generated by means of a suitable transducer, such as described in the above-mentioned British Patent, while the signal on the line 14 may be generated by means of an adjustable potentiometer.

In order to control the engine power, the system incorporates a suitable actuator 16 for actually adjusting the engine power in dependence on the control function exerted by the system, as signalled on a line 18. The actuator 16 may again take any suitable form, dependent, in part, on the type of engine. It may, for example, comprise a vacuum-powered actuator controlling a throttle valve. In the case of a turbo-charged diesel engine, where the induction manifold may not provide a convenient source of vacuum, an electric motor-type actuator may be used, and in the case of a diesel engine such an actuator could conveniently control a rack which adjusts the diesel fuel injectors. Whatever type of construction the actuator 16 has, however, it is provided with a microswitch or similar detector for producing an output signal on a line 20 when it has been set in its minimum setting by the speed regulator 10, that is, when the speed regulator has shut the engine power down to its minimum setting (as a result, of course, of exerting its speed regulating function in accordance with the relative magnitude of the signals on the lines 12 and 14).

As shown in FIG. 1, there is also provided an error amplifier 22 which compares the signals on the lines 12 and 14, and the resultant error signal, indicating the difference between the actual vehicle speed and the preset maximum Vr, is fed to a differentiator circuit 24. The differentiator circuit measures the rate of change of the error signal and is polarity-sensitive so as to produce an output, on line 26, only when the vehicle is decelerating, the output representing the deceleration rate of the vehicle. Line 26 is fed to one input of a comparator 28 whose second input is fed with a reference signal on a line 30 representing a predetermined level of deceleration, the exact value of which is pre-fixed depending on the vehicle. Comparator 28 produces an output on a line 32 when the actuator vehicle deceleration exceeds the reference level on line 30.

The system also includes a comparator and underspeed lockout circuit 34 which receives the signals on the lines 12 and 14. Circuit 34 produces an output on a line 36 only when the actual vehicle speed, represented by the signal on line 12, is in excess of Vr as represented by the signal on line 14.

Lines 32 and 36 are fed to an AND gate 38. The output of the gate 38 is fed through a further gate 40 and thence via a suitable power amplifier 42 to the actuator 16.

The gate 40 is controlled by an enable and hold circuit 44. Circuit 44 comprises an OR gate one of whose inputs is the signal on the line 20 (which is produced when actuator 16 has been set in its minimum engine power setting). The other input to the OR gate is received on a line 46 from the output of the gate 40. The output of the circuit 44 is connected to the control input of gate 40 by a line 48. Line 48 is also connected to an inhibit forward drive circuit 50 producing an output on a line 52 which is connected to the speed regulator 10 for a purpose to be described.

The operation of the system will now be described, assuming that the vehicle is initially running on a downhill stretch of road so that its speed increases (due to gravity) above the preset maximum Vr.

As the speed increases in this way, the speed regulator 10 will cause the actuator 16 to shut down the engine power to its minimum setting and when it reaches this setting, line 20 will be energised so as to cause the enable and hold circuit 44 to produce an output enabling or opening the gate 40.

If the contour of the road is such that it now levels out or begins to climb uphill, the vehicle speed will start to fall and an output will be produced by the differentiator 24 indicating the deceleration rate. When the deceleration rate exceeds the minimum set on the line 30, the comparator 28 produces an output on line 32 which energises one input of the AND gate 38. Provided that the actual vehicle speed is in excess of the preset maximum speed Vr, circuit 34 will produce an output on its line 36 and this will energise the other input of the AND gate 38. Gate 38 therefore produces an output which passes through the enabled gate 40 and energises the actuator 16 via amplifier 42. The actuator 16 is energised in such a sense as to begin to increase engine power. Of course, as soon as actuator 16 moves away from its minimum power setting, the signal on line 20 will disappear. However, the gate 40 will be maintained open by the feedback latching loop provided by line 46 via enable and hold circuit 44 and line 48.

As the actual vehicle speed is in excess of Vr at this time, the speed regulator 10 will of course tend to hold the actuator 16 in its minimum power setting. In order to enable the output from amplifier 42 to override this control function, the output from circuit 44 energizes the inhibit forward drive circuit 50 and the resultant signal on line 52 is arranged to temporarily disable the speed regulator 10 via a gate 54. Gate 54 is connected to be opened only by simultaneous existence of the signal on the line 32 and the output signal from a comparator 56. The comparator 56 compares the actual vehicle speed represented by the signal on line 12, with a reference signal representing a predetermined relatively high speed received on a line 58 and only produces an output signal when the vehicle speed is exceeding this relatively high speed. In this way, circuit 50 is prevented from disabling the speed regulator 10 during the latter's normal operation and can only carry out its disabling function when the vehicle speed is above the relatively high value represented by the reference signal on line 58 (which is arranged to be above the limit of speed control exercised by the regulator 10), and, simultaneously, the vehicle is decelerating at above a predetermined relatively high rate.

The system, therefore, responds to a certain specified set of conditions to increase engine power even when the actual vehicle speed is in excess of the preset maximum Vr. The specified set of conditions is as follows:

(a) The speed regulator 10 must have initially shut down the engine power to its minimum (so as to allow the signal on the line 20 to open the gate 40);

(b) the deceleration rate of the vehicle must exceed a predetermined minimum (so as to enable comparator 28 to produce its output on line 32);

(c) the circuit 34 must be detecting that the actual vehicle speed is in excess of the preset maximum Vr (so as to allow circuit 34 to produce its output on line 36).

Only when all these three conditions are satisfied together does the system override the action of the speed regulator 10 and increase engine power even though the actual vehicle speed is in excess of Vr.

The effect of this is that engine power begins to increase while the vehicle is decelerating (due to contour of the road levelling out or climbing uphill), and in this way engine power is made available before the vehicle speed falls to Vr. When the vehicle speed does fall to Vr, circuit 34 no longer produces an output on line 36, and gate 38 becomes closed. At the same time, the signal on line 46 disappears and the inhibit forward drive circuit 50 is de-actuated. The speed regulator 10 can thus now take over control of the actuator 16 in the normal way.

The effect of the system described, therefore, is to enable engine power to be increased considerably sooner, in conditions following a downhill stretch of road, than would be the case if the actuator 16 were controlled solely by the speed regulator 10. If the actuator 16 were controlled solely by the speed regulator 10, then it could not begin to increase engine power until the vehicle speed had actually fallen to Vr—and because of inevitable lags in the system, the vehicle speed would inevitably fall considerably (particularly if the vehicle were now climbing an uphill gradient) before the increased engine power could begin to compensate.

Therefore, by enabling engine power to be increased sooner than would otherwise be the case, the system illustrated reduces the loss of the kinetic energy gained by the vehicle running downhill.

Figure 2:
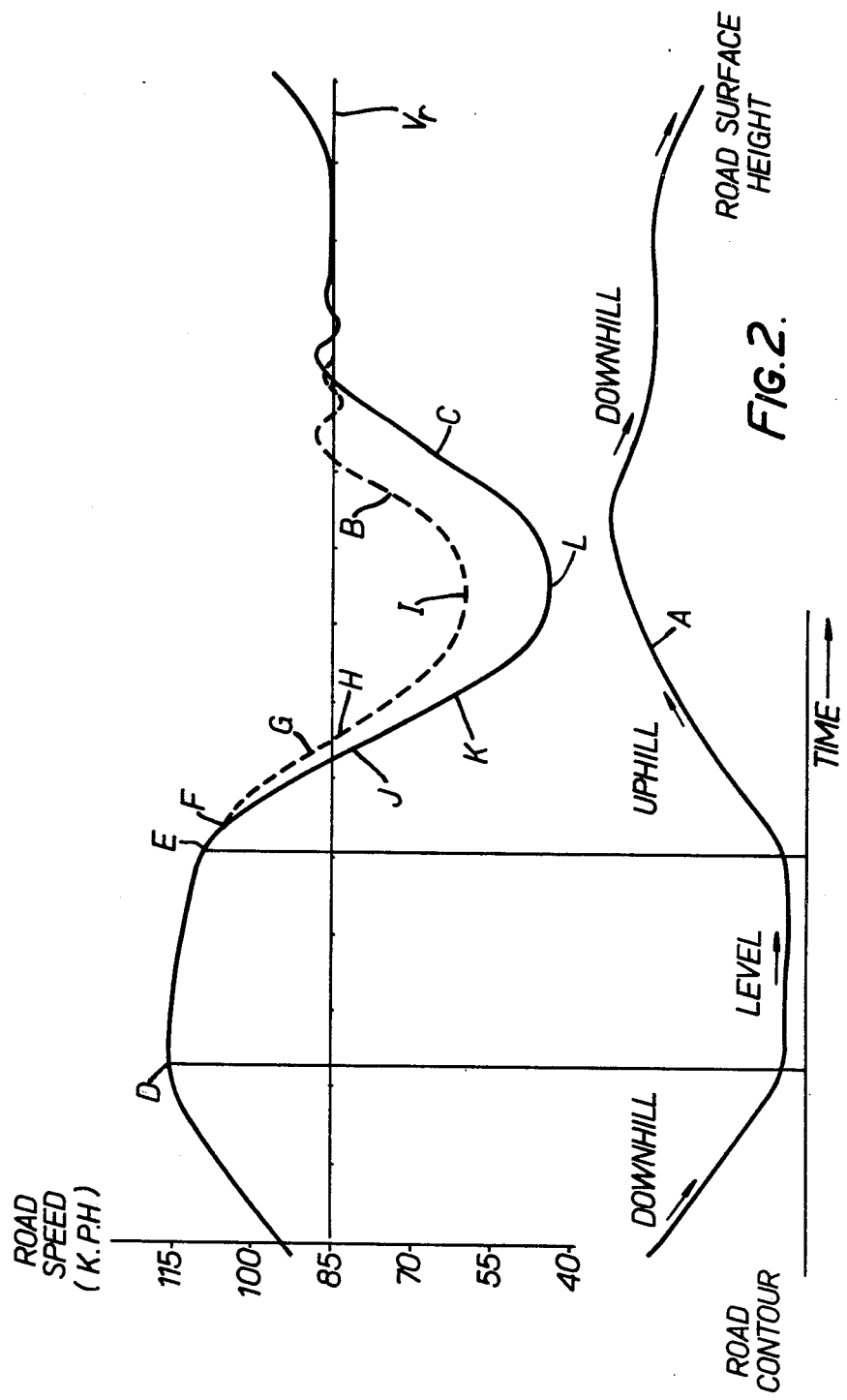
FIG. 2 is a diagram showing the operation of the system described with reference to FIG. 1.

FIG. 2 illustrates the operation of the system.

In FIG. 2, the vertical axis represents vehicle speed and the system is set so that Vr is 85 k.p.h. The lowermost curve, curve A, represents, in somewhat exaggerated form, a road contour in elevation. Curve B shows the variation of vehicle speed along the road under control of the system described with reference to FIG. 1, while curve C, shows for comparison purposes, corresponding variation of vehicle speed which would be produced if the actuator 16 were controlled solely by the speed regulator 10.

As shown by curve A, initially the vehicle runs downhill and the vehicle speed rises to 115 k.p.h. At point D, the road levels out and the vehicle speed begins to fall, although at a slow rate of deceleration. At point E, the road begins to climb uphill and the rate of deceleration of the vehicle increases. At point F, it is assumed that comparator 28 (FIG. 1) now energises line 32. Therefore, amplifier 42 becomes energised and actuator 16 begins to increase engine power. At point G, it is assumed that maximum power is now available from the engine.

At point H, the vehicle speed falls below Vr and line 36 is de-energised. The system therefore now comes under control of the speed regulator 10. Because of the uphill gradient, the vehicle speed continued to fall and reaches a minimum at point I, but thereafter increases and is then limited to the preset speed Vr by the speed regulator 10.

If the system were controlled solely by the speed regulator 10, it will be apparent that it would not be until point J that the speed regulator 10 could begin to energise actuator 16 to increase engine power, and (because of the inevitable delay in the system) full engine power would not be available until point K. The result of this is that the vehicle speed would fall to a minimum (at point L) before beginning to rise again until eventually limited to Vr; and it will be noted that there is thus a considerable loss in speed, representing a loss of valuable kinetic energy (which will be reflected in increased fuel consumption) and increased journey time.

Figure 3:
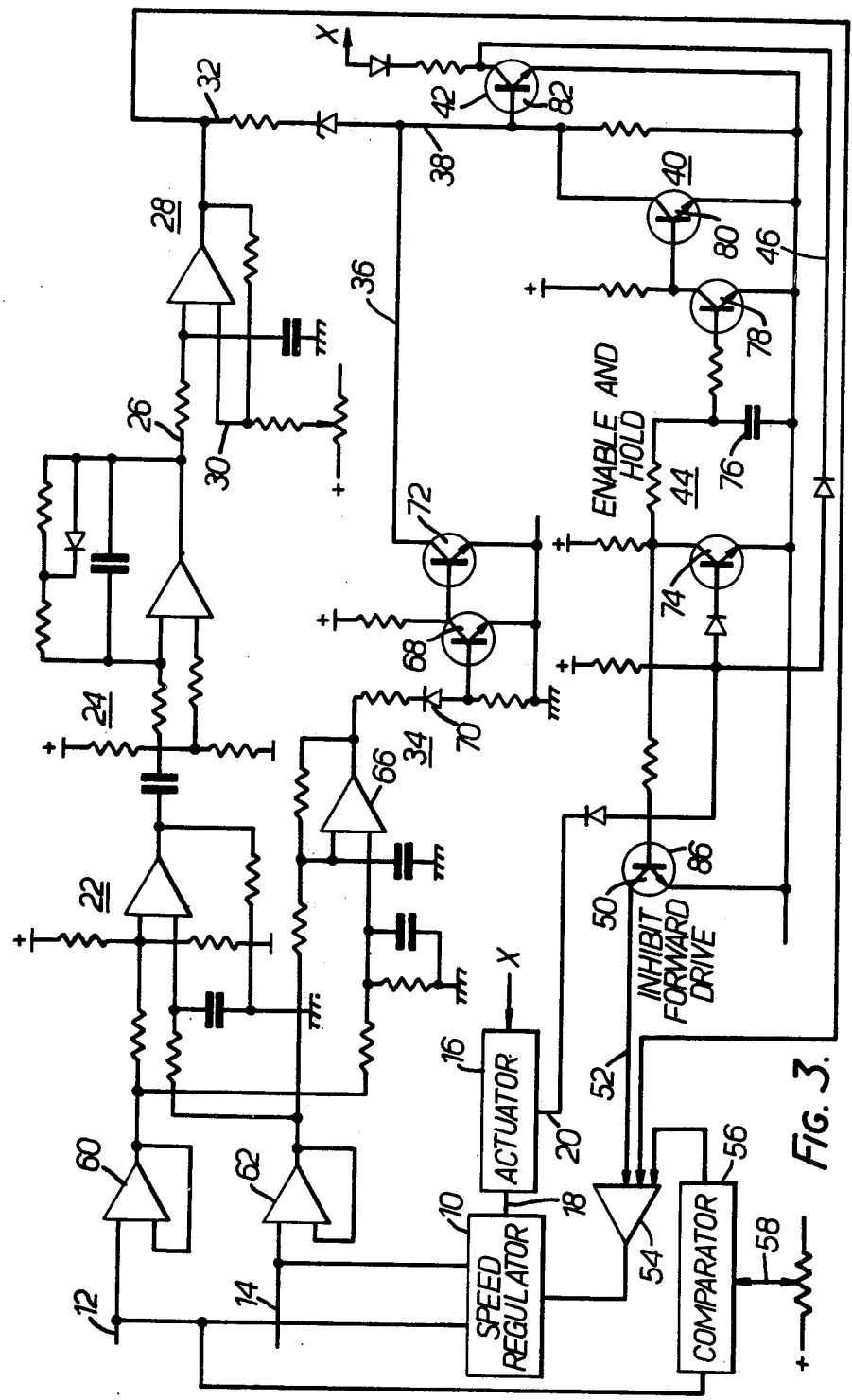
FIG. 3 is a schematic circuit diagram corresponding to the block circuit diagram of FIG. 1.

FIG. 3 is a circuit diagram showing one way in which the block diagram of FIG. 1 can be carried into practice. In FIG. 3, parts corresponding to parts in FIG. 1 are correspondingly referenced.

As shown, the error amplifier 22 and the comparator and underspeed circuit 34 are preceded by respective buffer amplifiers 60 and 62.

The circuit 34 comprises a speed comparator 66 which produces an output signal whose magnitude and polarity depending on the difference between the signals on the lines 12 and 14. This signal is fed to the base of a transistor 68 via a zener diode 70 which switches on only when the magnitude and polarity of the output from amplifier 66 is such as to indicate that the actual vehicle speed exceeds Vr by at least a predetermined amount. Under these conditions, zener diode 70 allows transistor 68 to be rendered conductive, thus switching off a transistor 72 to produce the required signal on line 36.

The enable and hold circuit 44 is formed by a transistor 74 whose base is connected to receive the signal on the line 20 (indicating the actuator is in the minimum power setting) and also the signal from the feedback loop 46; each of these signals is such as to switch transistor 74 off. This causes a capacitor 76 to be charged (to provide a time delay to prevent spurious operation), and when capacitor 76 is charged, a transistor 78 is turned on which in turn turns off a transistor 80. In this way, a transistor 82, which performs the function of the AND gate 38 and amplifier 42 in FIG. 1, is able to be turned on by the signals from the comparator 28 and the circuit 34.

The inhibit forward drive circuit 50 comprises a transistor 86 which is connected to be turned on (to energise line 52) when transistor 74 is turned off.

It will be appreciated that the circuits described with reference to FIGS. 1 and 3 are merely exemplary, and other circuits for performing the functions described can be used instead. Merely by way of example, the error amplifier 22, the differentiator 24, and the comparator 28 could be replaced by an arrangement for sampling the signal on line 12 at regular intervals. Provided that the comparator and underspeed lockout circuit 34 were indicating that the actual vehicle speed was in excess of Vr, then the successive signal samples would be fed to a comparator which would compare the value of each such sample with that of the preceding sample, in this way detecting whether deceleration was occurring. As before, normal control of the actuator 16 by the speed regular 10 would be resumed when the comparison of successive samples indicated that deceleration had stopped.

What is claimed is:

1. A speed regulating system for regulating the speed of an engine-driven vehicle, comprising engine power control means for controlling the power of the engine of the vehicle, means responsive to the actual vehicle speed to produce an input signal representing actual vehicle speed, means producing a speed reference signal representing a pre-set value of vehicle speed, speed regulating means connected to respond to the two said signals and to produce an output signal when the actual vehicle speed exceeds the pre-set value, means feeding the output signal to the engine power control means whereby to tend to prevent the vehicle from being driven by the engine at a speed in excess of the pre-set value, override control means connected to receive the input and speed reference signals and to detect therefrom when the vehicle is decelerating at at least a predetermined rate and that, simultaneously, the vehicle speed exceeds the pre-set value, and to produce an override signal in response to such detection, and means feeding the override signal to the engine power control means to override the effect thereon of the speed regulating means and to cause the engine power control means to tend to increase the engine power.

2. A system according to claim 1, in which the override control means includes an interlock circuit which prevents production of the override control signal unless an enable signal is received, and including enable means connected to the engine power control means to produce the said enable signal only when the engine power control means has reduced the engine power to a predetermined minimum.

3. A system according to claim 1, in which the override control means comprises:

means connected to receive the input and the speed reference signals and to produce an error signal representing the difference therebetween, differentiating means connected to receive the error signal and to differentiate it whereby to produce a deceleration rate signal representing the rate of deceleration of the vehicle, and first comparing means connected to compare the deceleration rate signal with a rate reference signal representing the said predetermined rate of deceleration whereby to produce a first condition signal when the vehicle is decelerating at at least the predetermined rate;

second comparing means connected to receive the input and the speed reference signals and to produce a second condition signal in response to a comparison thereof when the vehicle speed exceeds the pre-set value; and a coincidence gate connected to receive the first and second condition signals to produce the said override signal.

4. A system according to claim 1, in which the override control means comprises:

sampling means connected to receive the input signal and to repetitively and regularly sample it, first comparing means connected to compare the magnitude of each sample with the magnitude of the next preceding sample whereby to produce a deceleration rate signal representing the rate of deceleration of the vehicle, and second comparing means for comparing the deceleration rate signal with a rate reference signal representing the said predetermined rate whereby to produce a first condition signal when the vehicle is decelerating at at least the predetermined rate;

third comparing means connected to receive the input signal and the speed reference signal whereby to produce a second condition signal in response to the comparison when the vehicle speed exceeds the pre-set value; and a coincidence gate connected to receive the first and second condition signals to produce the said override signal.

5. A system according to claim 3, including means connected to the engine power control means to produce an enable signal when the engine power control means has reduced the engine power to a predetermined minimum, and in which the override control means includes a second gate connected to receive the output of the coincidence gate and also to receive the enable signal whereby to produce the said override signal only in response to the enable signal having existed simultaneously with an output from the coincidence gate.

* * * * *